United States Patent
Hushon et al.

(10) Patent No.: US 8,990,550 B1
(45) Date of Patent: Mar. 24, 2015

(54) METHODS AND APPARATUS FOR SECURING COMMUNICATIONS BETWEEN A NODE AND A SERVER BASED ON HARDWARE METADATA GATHERED BY AN IN-MEMORY PROCESS

(71) Applicants: John Daniel Hushon, Medfield, MA (US); Nicholas Weaver, North Richland Hills, TX (US); Tom McSweeney, Hoquiam, WA (US)

(72) Inventors: John Daniel Hushon, Medfield, MA (US); Nicholas Weaver, North Richland Hills, TX (US); Tom McSweeney, Hoquiam, WA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/728,382

(22) Filed: Dec. 27, 2012

(51) Int. Cl.
*H04L 29/06* (2006.01)
*G06F 9/44* (2006.01)
*G06F 21/44* (2013.01)

(52) U.S. Cl.
CPC .......... *H04L 63/0876* (2013.01); *G06F 9/4401* (2013.01); *G06F 21/44* (2013.01)
USPC .......................................................... 713/2

(58) Field of Classification Search
CPC ..... G06F 21/44; G06F 21/575; H04L 9/3234; H04L 63/0876
USPC .......................................................... 713/2
See application file for complete search history.

(56) References Cited

U.S. PATENT DOCUMENTS

| | | | | |
|---|---|---|---|---|
| 2003/0202663 | A1* | 10/2003 | Hollis et al. | 380/282 |
| 2010/0146634 | A1* | 6/2010 | Choi et al. | 726/26 |
| 2011/0131636 | A1* | 6/2011 | Shani | 726/5 |
| 2012/0215896 | A1* | 8/2012 | Johannsen | 709/223 |
| 2013/0136263 | A1* | 5/2013 | Maity | 380/278 |

OTHER PUBLICATIONS

Kohno, Tadayoshi, Andre Broido, and Kimberly C. Claffy. "Remote physical device fingerprinting." Dependable and Secure Computing, IEEE Transactions on 2.2 (2005): 93-108.*

* cited by examiner

*Primary Examiner* — Yin-Chen Shaw
*Assistant Examiner* — Michael Guirguis
(74) *Attorney, Agent, or Firm* — Ryan, Mason & Lewis, LLP

(57) ABSTRACT

Methods and apparatus are provided for securing communications between a node and a server, for example, during a boot process. In accordance with an aspect of the invention, a method is provided for securing communications between a node and a server, comprising: dynamically gathering hardware-related metadata for the node using a process running in memory; generating a unique identifier for the node using the hardware-related metadata; generating a public/private key pair for the node using the unique identifier; and securing communications between the node and the server using the public/private key pair. The process comprises, for example, an in-memory microkernel executing on a boot node. The hardware-related metadata comprises, for example, information about physical characteristics of the node. The unique identifier for the node can optionally be further based on information obtained from a Trusted Processing Module. The node can be authenticated using the public/private key pair.

18 Claims, 3 Drawing Sheets

100

METHODS AND APPARATUS FOR SECURING COMMUNICATIONS BETWEEN A NODE AND A SERVER BASED ON HARDWARE METADATA GATHERED BY AN IN-MEMORY PROCESS

FIELD OF THE INVENTION

The present invention relates generally to security techniques for communications among nodes in a system.

BACKGROUND OF THE INVENTION

Network booting is the process of booting a computer from a network device rather than a local drive. During the network boot process, it is important to establish a chain of trust between the nodes that are booting and the source nodes that they are interacting with over a network during the boot process.

Razor is a hardware provisioning solution for data centers developed by Puppet Labs and EMC Corp. Razor employs an in-memory instance of a microkernel executing on a node. The in-memory microkernel discovers the hardware on the node, such as central processing units, disks and memory, and reports the node inventory information to a Razor node state controller server in real-time.

A need exists for methods and apparatus for securing communications between a node and a server during and after a boot process.

SUMMARY OF THE INVENTION

The present invention in the illustrative embodiments described herein provides techniques for securing communications between a node and a server, for example, during a boot process. In accordance with an aspect of the invention, a method is provided for securing communications between a node and a server, comprising: dynamically gathering hardware-related metadata for the node using a process running in memory; generating a unique identifier for the node using the hardware-related metadata; generating a public/private key pair for the node using the unique identifier; and securing communications between the node and the server using the public/private key pair.

The process comprises, for example, an in-memory microkernel executing on a boot node. The hardware-related metadata comprises, for example, information about physical characteristics of the node. In one exemplary embodiment, the unique identifier for the node is further based on information obtained from a Trusted Processing Module on the node. The node can also be authenticated using the public/private key pair.

The security techniques of the illustrative embodiments overcome one or more of the problems associated with the conventional techniques, and provide improved communication security by generating public/private key pairs based on hardware metadata gathered by an in-memory process during and/or after the boot process. These and other features and advantages of the present invention will become more readily apparent from the accompanying drawings and the following detailed description.

DETAILED DESCRIPTION

The present invention provides methods and apparatus for securing communications between a node and a server during and after a boot process. Aspects of the present invention provide improved secure communications by generating public/private key pairs based on hardware metadata gathered by an in-memory microkernel process during and after the boot process.

Figure 1:
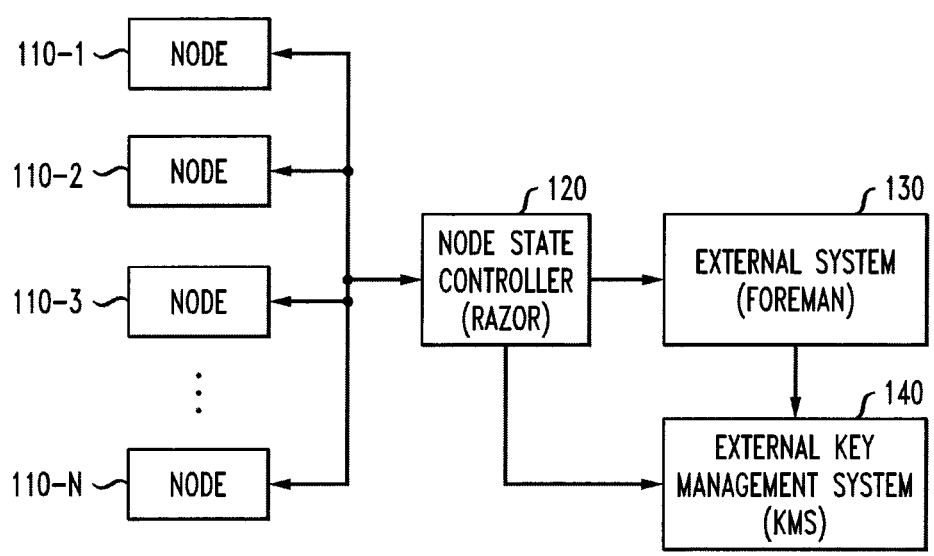
FIG. 1 is a schematic diagram illustrating an electronic environment in which the present invention can be implemented.

FIG. 1 is a schematic diagram illustrating an exemplary electronic environment 100 in which the present invention can be implemented. As shown in FIG. 1, the exemplary electronic environment 100 comprises a plurality of nodes 110-1 through 110-N (hereinafter, collectively referred to as nodes 110) that communicate with a node controller server 120, such as a Razor server.

As discussed hereinafter, during a network boot process, a node 110 contacts the node controller server 120 and the node controller server 120 discovers the node 110. The node controller server 120 sends a microkernel to execute in memory on the discovered node 110. The microkernel gathers hardware-related metadata about the node 110 and provides the gathered hardware-related metadata to the node controller server 120. The hardware-related metadata comprises, for example, information about physical characteristics of the node 110.

In accordance with aspects of the present invention, the gathered hardware-related metadata is used to generate public/private key pairs that are used to secure communications between the nodes 110 and the node controller server 120.

In addition, as discussed further below in conjunction with FIG. 2, the node controller server 120 interacts with an external system 130, such as a Foreman server, for BIOS/Firmware updates of a node 110 and with an external key management system (KMS) 140, which stores the public/private key pairs generated in accordance with aspects of the present invention.

Figure 2:
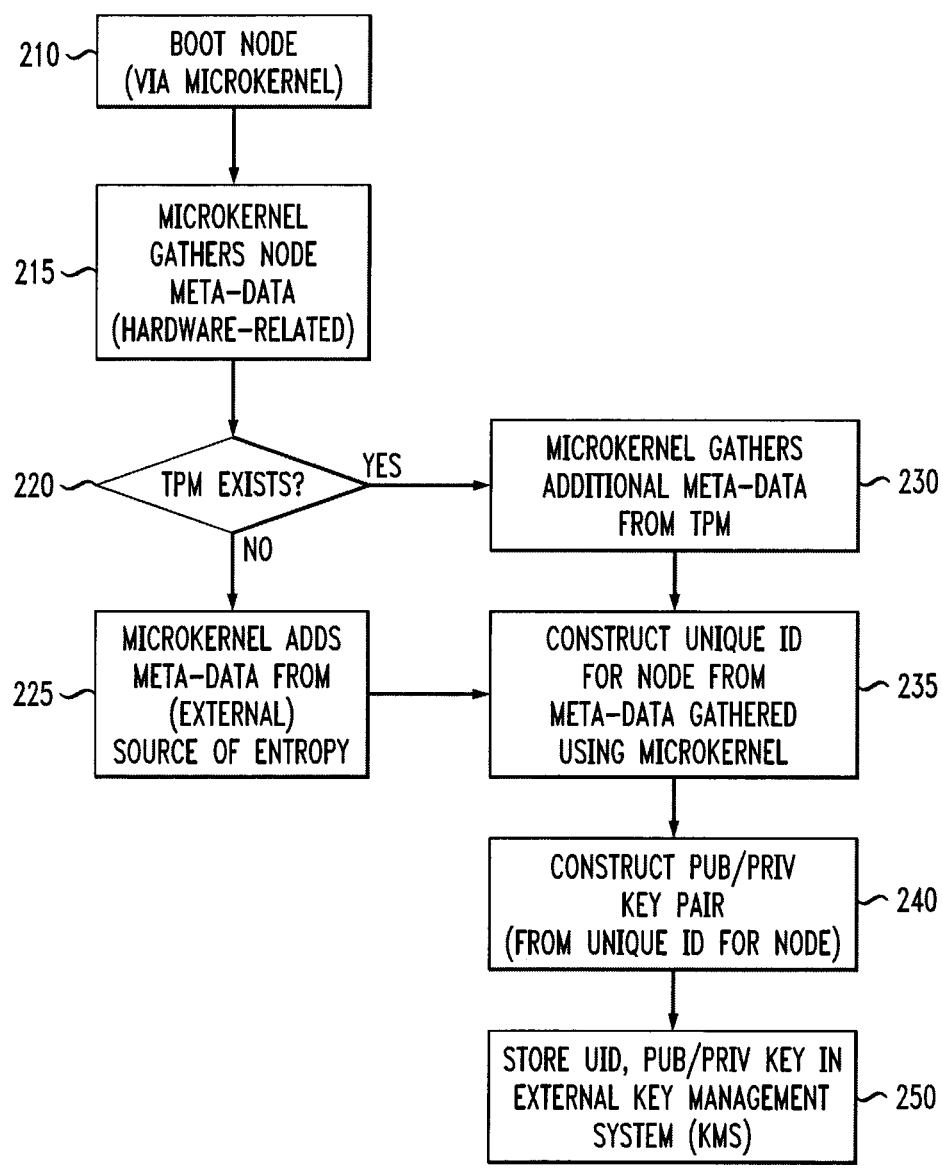
FIG. 2 is a flow chart illustrating an exemplary key generation process incorporating aspects of the present invention.

FIG. 2 is a flow chart illustrating an exemplary key generation process 200 incorporating aspects of the present invention. Generally, the exemplary key generation process 200 generates the keys that are used to secure communications with a node 110 from the information that is gathered using the in-memory microkernel process. As shown in FIG. 2, the exemplary key generation process 200 is initiated in the Boot Node (via the microkernel) during step 210, as part of the boot process. Thereafter, the microkernel gathers hardware-related metadata about the 110 during step 215.

A test is performed during step 220 to determine if a Trusted Processing Module (TPM) exists on the node 110. If there is a Trusted eXecution Technology (TXT) chip available on the node 110, the Trusted Processing Module included in the TXT chip is used to obtain the unique ID for this system. If it is determined during step 220 that a TPM exists on the node 110, then the microkernel gathers additional metadata from the TPM during step 230.

If, however, it is determined during step 220 that a TPM does not exist on the node 110, then the microkernel adds metadata from an external source of entropy during step 225.

The exemplary key generation process 200 constructs a unique identifier (ID) for the node 110 from the metadata gathered by the microkernel during step 235. The public/private key pair is then constructed from the unique ID for the node 110 during step 240. The public/private key pair is then stored in the external key management system 140 during step 250, along with the unique ID that is used to retrieve that key pair for later use with this system.

It is noted that the unique ID obtained through the TPM is guaranteed to be unique to the current node 110, and the entropy in the values for that unique ID should be sufficient to generate keys that are hard to guess. If the unique ID is generated only from hardware-related metadata, there are no such guarantees. Thus, entropy is optionally added from an external source during step 225. For example, without the additional entropy, there is a chance that some of the information might be duplicated (things that are supposed to be unique, like disk serial numbers, often turn out not to be in practice for some vendors, and even if everything is unique the values for these metadata parameters might not be different enough to provide the entropy necessary to make the keys we generate hard to crack).

Figure 3:
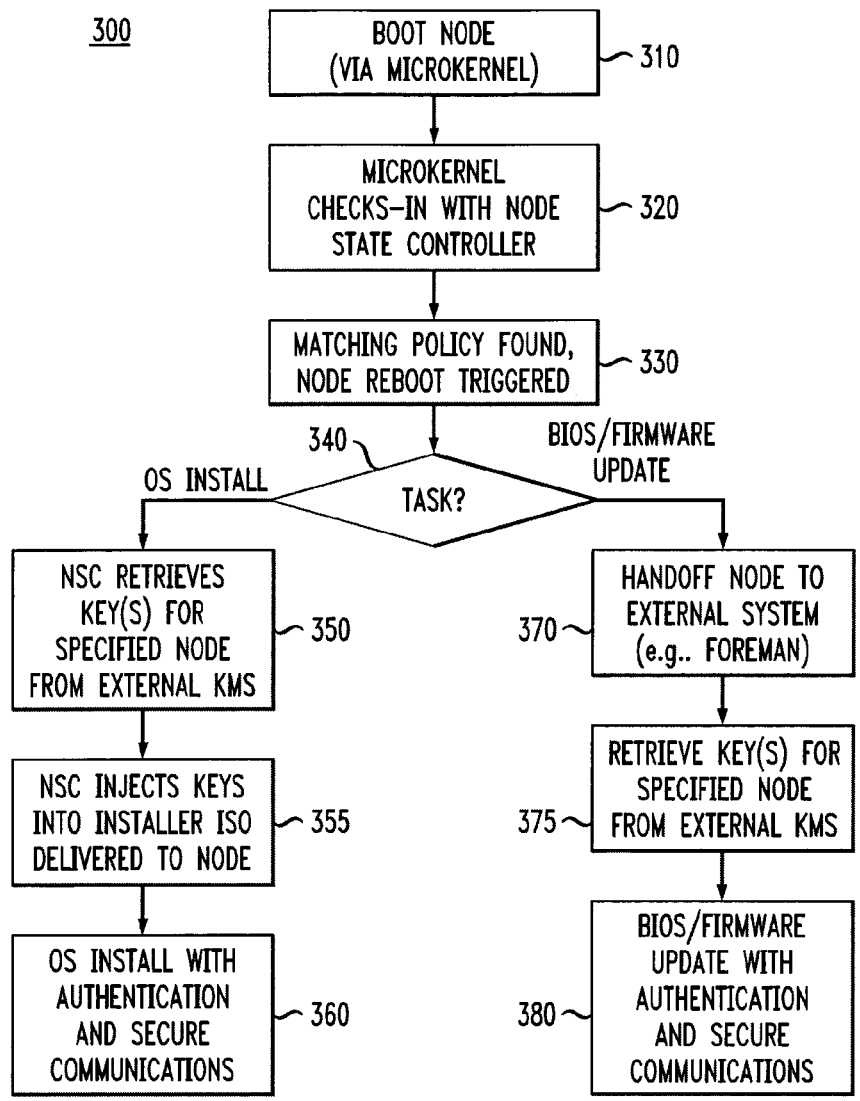
FIG. 3 is a flow chart illustrating an exemplary network security process incorporating aspects of the present invention.

FIG. 3 is a flow chart illustrating an exemplary network security process 300 incorporating aspects of the present invention. In the exemplary embodiment of FIG. 3, the public/private key pairs for a node 110 are used differently depending on the task that the keys are being used for. As shown in FIG. 3, the exemplary network security process 300 is initiated in the Boot Node (via the microkernel) during step 310, as part of the boot process. Thereafter, the microkernel checks-in with the node controller server 120 during step 320.

If a matching policy is found during step 330, a node reboot is triggered. A test is performed during step 340 to determine which predefined task is being performed (OS Install or BIOS/Firmware updates in the exemplary embodiments). In further variations, the task can be related to configuration changes, such as cards being replaced or configuration settings being changed.

If it is determined during step 340 that the task is an OS install, then the node controller server 120 retrieves key(s) for the specified node from the external KMS 140 during step 350. Thereafter, the node controller server 120 injects the keys into the installer International Standards Organization (ISO) file delivered to the node during step 355. An ISO file may comprise, for example, any file containing an image of an "ISO 9660 filesystem" (e.g., the type of filesystem used in a CDROM or a DVD-ROM). These files typically have a filename with a .iso extension ("*.iso"). The operating system is then installed with authentication and secure communications during step 360.

If, however, it is determined during step 340 that the task is a BIOS/Firmware update, then the node 110 is handed off to an external system (e.g., the Foreman server 130) for the BIOS/Firmware update during step 370. As part of the hand-off process, the unique ID for the node 110 is provided to the external system 130. The external system 130 will then be able to obtain the key (or keys) from the KMS 140 that are needed to securely communicate with the OS instance that is running on the node 110 (e.g., a specialized instance of the Razor Microkernel that supports BIOS/Firmware updates), and the key(s) will then be used to authenticate the two systems 110, 130 (with each other) and secure communications between them.

The key(s) for the specified node 110 are retrieved from the external KMS 140 during step 375. The BIOS/Firmware update is then performed with authentication and secure communications using the retrieved keys during step 380.

Figure 4:
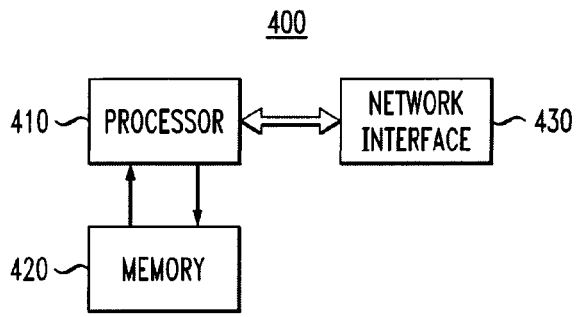
FIG. 4 illustrates one possible implementation of a node, node state controller, external system or key management system of the exemplary network environment of FIG. 1.

FIG. 4 shows one possible implementation of a given processing device 400 of the FIG. 1 exemplary electronic environment 100. The processing device 400 as shown may be viewed as representing, for example, a node 110, node state controller 120, external system 130 or key management system 140. The processing device 400 in this implementation includes a processor 410 coupled to a memory 420 and a network interface 430. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 420 and executed by the corresponding processor 410. The memory 420 is also used for storing information used to perform computations or other operations associated with the disclosed authentication techniques.

While various embodiments of the invention have been particularly shown and described, it will be understood by those skilled in the art that various changes in form and details may be made therein without departing from the spirit and scope of the invention as defined by the appended claims.

In some arrangements, node state controller 120 is implemented by a set of processors or other types of control/processing circuitry running software. In such arrangements, the software instructions can be delivered to node state controller 120 in the form of a computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used. Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of public/private key pairs, it is to be appreciated that the invention is more broadly applicable to any other type of authentication information.

The illustrative embodiments of the invention as described herein provide improved secure communications between nodes and servers. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the nodes 110.

It should again be emphasized that the particular authentication techniques described above are provided by way of illustration, and should not be construed as limiting the present invention to any specific embodiment or group of embodiments. Also, the particular configuration of system elements shown in the figures and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for securing communications between a boot node and a server, comprising:
    receiving a microkernel at said boot node from said server;
    executing said microkernel in a memory of said boot node to dynamically gather hardware-related metadata for said boot node, wherein said hardware-related metadata comprises information about physical characteristics of said boot node;
    generating a unique identifier for said boot node using said hardware-related metadata;
    generating a public/private key pair for said boot node using said unique identifier;
    storing said generated public/private key pair with said associated unique identifier in a key management system; and
    securing communications between said boot node and said server using said public/private key pair retrieved from said key management system using said associated unique identifier for said boot node.

2. The method of claim 1, wherein said unique identifier for said boot node is further based on information obtained from a Trusted Processing Module on said boot node.

3. The method of claim 1, further comprising the step of storing said public/private key pair in an external key management system.

4. The method of claim 1, wherein said communications comprise one or more of a configuration change, an operating system installation, a BIOS update and a firmware update.

5. The method of claim 1, further comprising the step of authenticating said boot node using said public/private key pair.

6. The method of claim 1, further comprising the step of securing communications between said boot node and at least one additional node using said public/private key pair.

7. An apparatus for securing communications between a boot node and a server, the apparatus comprising:
    a memory; and
    at least one hardware device, coupled to the memory, operative to implement the following steps:
    receive a microkernel at said boot node from said server;
    execute said microkernel in a memory of said boot node to dynamically gather hardware-related metadata for said boot node, wherein said hardware-related metadata comprises information about physical characteristics of said boot node;
    generate a unique identifier for said boot node using said hardware-related metadata;
    generate a public/private key pair for said boot node using said unique identifier;
    store said generated public/private key pair with said associated unique identifier in a key management system; and
    secure communications between said boot node and said server using said public/private key pair retrieved from said key management system using said associated unique identifier for said boot node.

8. The apparatus of claim 7, wherein said unique identifier for said boot node is further based on information obtained from a Trusted Processing Module on said boot node.

9. The apparatus of claim 7, wherein said at least one hardware device is further configured to store said public/private key pair in an external key management system.

10. The apparatus of claim 7, wherein said communications comprise one or more of a configuration change, an operating system installation, a BIOS update and a firmware update.

11. The apparatus of claim 7, wherein said at least one hardware device is further configured to authenticate said boot node using said public/private key pair.

12. The apparatus of claim 7, wherein said at least one hardware device is further configured to secure communicate between said boot node and at least one additional node using said public/private key pair.

13. A non-transitory machine-readable recordable storage medium for securing communications between a boot node and a server, wherein one or more software programs when executed by one or more processing devices implement the following steps:
    receiving a microkernel at said boot node from said server;
    executing said microkernel in a memory of said boot node to dynamically gather hardware-related metadata for said boot node, wherein said hardware-related metadata comprises information about physical characteristics of said boot node;
    generating a unique identifier for said boot node using said hardware-related metadata;
    generating a public/private key pair for said boot node using said unique identifier;
    storing said generated public/private key pair with said associated unique identifier in a key management system; and
    securing communications between said boot node and said server using said public/private key pair retrieved from said key management system using said associated unique identifier for said boot node.

14. The non-transitory machine-readable recordable storage medium of claim 13, wherein said unique identifier for said boot node is further based on information obtained from a Trusted Processing Module on said boot node.

15. The non-transitory machine-readable recordable storage medium of claim 13, further comprising the step of storing said public/private key pair in an external key management system.

16. The non-transitory machine-readable recordable storage medium of claim 13, wherein said communications comprise one or more of a configuration change, an operating system installation, a BIOS update and a firmware update.

17. The non-transitory machine-readable recordable storage medium of claim 13, further comprising the step of authenticating said boot node using said public/private key pair.

18. The non-transitory machine-readable recordable storage medium of claim 13, further comprising the step of securing communications between said boot node and at least one additional node using said public/private key pair.

* * * * *

UNITED STATES PATENT AND TRADEMARK OFFICE
CERTIFICATE OF CORRECTION

PATENT NO. : 8,990,550 B1
APPLICATION NO. : 13/728382
DATED : March 24, 2015
INVENTOR(S) : John Daniel Hushon et al.

Page 1 of 1

It is certified that error appears in the above-identified patent and that said Letters Patent is hereby corrected as shown below:

Specification

Column 2, line 56, replace "about the 110" with --about the node 110--.

Signed and Sealed this
Fifth Day of April, 2016

Michelle K. Lee
*Director of the United States Patent and Trademark Office*